United States Patent [19]

Hastings

[11] 4,236,582

[45] Dec. 2, 1980

[54] POWERED GROUND AERATOR

[76] Inventor: Paul F. Hastings, N. 5509 Market St., Spokane, Wash. 99207

[21] Appl. No.: 11,510

[22] Filed: Feb. 12, 1979

[51] Int. Cl.³ .............................................. A01B 45/02
[52] U.S. Cl. ..................................... 172/22; 172/116; 172/494
[58] Field of Search ............................. 172/21, 22, 116

[56] References Cited

U.S. PATENT DOCUMENTS

| 2,056,337 | 10/1936 | Archibald | 172/21 |
|---|---|---|---|
| 2,236,562 | 4/1941 | Brandes | 172/22 |
| 2,347,748 | 5/1944 | Melling | 172/21 |
| 3,022,834 | 2/1962 | Ruka et al. | 172/21 |
| 3,802,513 | 4/1974 | Ploenges | 172/21 |

FOREIGN PATENT DOCUMENTS 661287  11/1951  United Kingdom ...................... 172/21

*Primary Examiner*—Paul E. Shapiro
*Attorney, Agent, or Firm*—Wells, St. John & Roberts

[57] ABSTRACT

A powered machine for moving along the ground surface and producing a succession of holes therein to aerate the soil. The present aerator includes a pair of ground-penetrating members that are moved alternately to engage, penetrate, and disengage the ground's surface. They are moved both vertically and horizontally to "walk" the aerator in a forward path. Each ground-penetrating member is moved through an elliptical circuit in a vertical plane parallel with the forward path. The penetrating members are retained in substantially upright orientation throughout the complete circuit. They are tipped slightly as they engage and leave engagement with the ground to form a uniform upwardly open hole as the aerator is propelled forwardly.

14 Claims, 5 Drawing Figures

POWERED GROUND AERATOR

BACKGROUND OF THE INVENTION

The present invention is related to powered apparatus for aerating or producing shallow holes along a ground surface.

It is often useful to "aerate" lawns and gardens by perforating the ground surface. This is done to allow the soil below to "breathe" and to allow moisture to be absorbed in the subsoil areas. Ground aeration is primarily performed on lawns where grass clippings and roots have caked along the ground surface preventing moisture from getting to the subsoil root areas.

Ground aerating has been accomplished both by hand and by power units. Hand aerating may be accomplished simply by pushing a pointed tool such as a pitchfork or special lawn aerating tool into the ground surface, then removing it to leave an exposed hole. This is a slow and tedious task, especially where large areas are to be aerated. Power aerators, on the other hand, operate to effectively aerate large surfaces. However, they are incapable of producing a uniform hole in the ground surface. Rather, they initially form a hole but tear through the ground surface as they are withdrawn, due to forward movement of the aerator framework.

Power aerators are known to include an eccentric drive or cam action mechanism by which the ground-penetrating members are moved substantially vertically into and out of the ground while simultaneously moving in a circular orbit. This action allows for formation of a smooth vertically oriented hole in the ground surface, at least theoretically. Actually, the forward motion is initiated at the precise time the penetrating members engage the ground surface. Both penetration and forward motion is imparted as the members are driven downwardly and rearwardly to move the aerator framework along a forward path. Similarly, retraction of the penetrating members occurs simultaneously with horizontal movement. The difficulty, then, is that the penetrating members do not have substantial purchase in the ground prior to the initiation of forward horizontal movement. They therefore tend to tear through the ground surface until they reach the point of maximum penetration. Then, as they are retracted from the ground surface, they again lose purchase and have a tendency to again tear through the ground surface.

It therefore becomes desirable to obtain some form of powered aerating device that will function to effectively produce holes in the ground surface without tearing through the adjacent soil and while simultaneously moving forwardly in response to horizontal movement of the ground penetrating members.

DETAILED DESCRIPTION OF A PREFERRED EMBODIMENT

Figure 1:
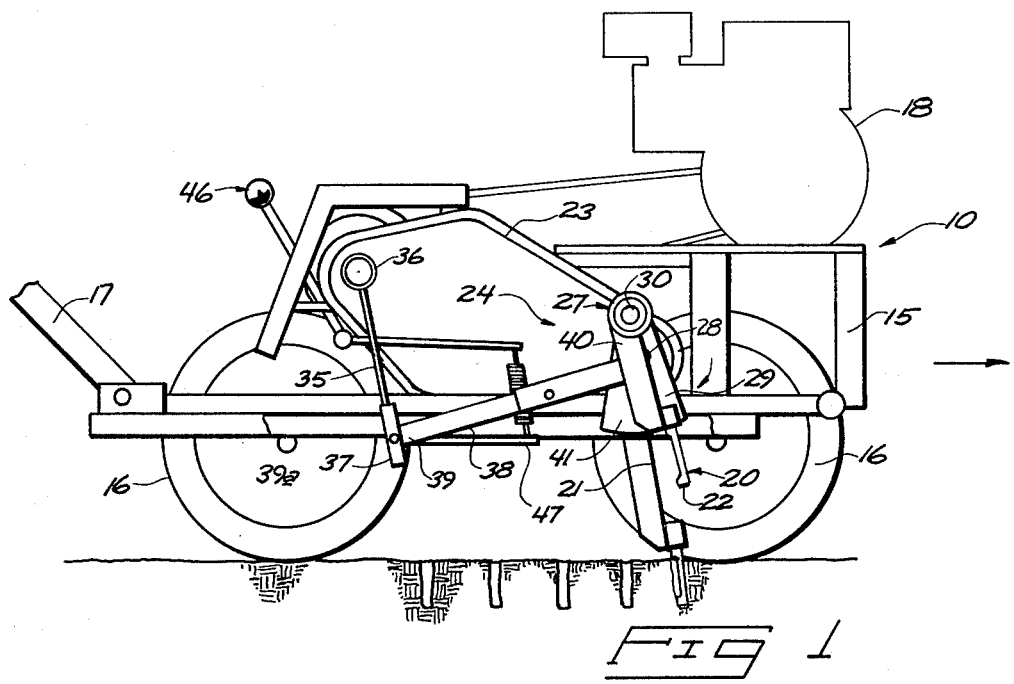
FIG. 1 is a fragmented side elevational view of the present aerator.

An aerator exemplifying a preferred embodiment of the present invention is generally designated in the drawings by the reference character 10. The present aerator is movable along a ground surface 11 for the purpose of producing a series of holes 12 in the ground surface that will allow the soil below the surface to breathe and to absorb moisture. The present aerator is powered and will move by "walking" itself along the ground surface in a forward direction as indicated by the arrows in FIGS. 1 and 2.

The aerator 10 includes a supportive rigid framework 15 that is movably mounted by wheels 16 on the ground surface. A handle 17 extends angularly rearward from the frame 15, providing access to the operator who merely guides the aerator along as it moves itself forwardly. Four supportive wheels 16 are illustrated. However, it is conceivable that fewer wheels may be used.

The holes 12 are formed in the ground 11 by operation of an aeration means 27 that includes ground-penetrating members 20. The members 20 are utilized to displace soil at the ground surface to form the upwardly open holes 12 therein. Basically, each ground-penetrating member 20 is elongated and tubular, with a hollow interior leading to an open bottom end 22. Slots 21 may be provided along the sides of the members to facilitate discharge of "plugs" cut from the soil surface. The tubes are pointed at the ends 22 to facilitate insertion. The "plugs" of the soil are forced into the hollow interiors of the tubes as they are pushed into the ground. The plugs will remain there as the tubes are retracted upwardly. The next operational cycle will bring the tubes into ground contact again, at which time the previous "plugs" are forced out through the slots 21 by the next successive "plugs".

The ground-penetrating members are operated cyclically by power means 18. The power means 18 may be comprised of a standard small bore gasoline engine of the type currently utilized on powered lawn implements. It is operatively connected to the penetration members 20 through a speed reduction unit 23 which may be either a gear reduction unit or a chain and sproket reduction mechanism.

The aerating means 27 is connected to the power means 18 through the gear reduction unit 23 for the purpose of moving the ground penetration members 20 relative to the ground surface. The path of this motion intersects the ground surface so that the penetration members 20 will be driven repeatedly into the ground.

The aerator means 27 is connected to the power means 18 through a drive shaft 28. The drive shaft 28 is carried on the frame 15 for rotational movement about a horizontal crank axis. The crank axis is also perpendicular to the forward path of travel.

Means 27 also includes eccentric cranks 29 provided on opposite ends of the drive shaft 28. Each crank 29 includes an eccentric pivot 30 defined by a bearing to include an eccentric axis. The eccentric pivot axes are radially spaced from the crank axis and are situated on opposite sides thereof. Preferably, the eccentric pivot axes are angularly spaced from one another by 180° about the crank axis. The ground-penetrating members 20 are pivotably connected to the cranks 29 and are both pivotable about the eccentric pivots 30 and about the crank axis. Rotation of the drive shaft will cause vertical movement of the hole forming means 20.

A linkage means 34 is provided operatively connecting the ground-penetrating members and frame for imparting oscillating motion to the penetrating members 20 as they are moved up and downwardly in response to operation of the aeration means 27. It is the linkage means 34 that controls the alternating cyclical motion of the penetrating members 20 to cause a "walking motion" that serves to pull the aerator along the ground surface.

Figure 2:
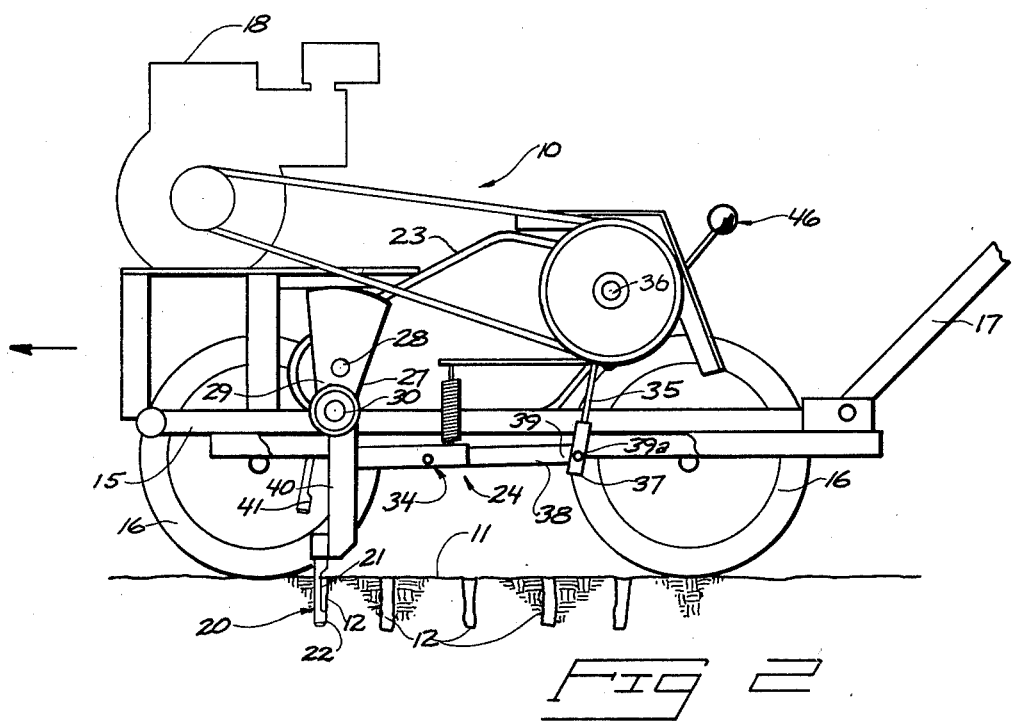
FIG. 2 is a view similar to FIG. 1 only showing the opposite side of my aerator.

The linkage means 24 includes a pair of rocker arms 35. Each rocker arm 35 is pivotably connected at an end 36 to the frame for free pivotal movement about an idler axis that is parallel to the crank axis and the eccentric pivot axes. The rocker arms 35 are provided, one on each side of the frame, as indicated in FIGS. 1 and 2. The rocker arms 35 are coaxially mounted to the frame and extend downwardly from ends 36 equal distances to lower ends 37. Cross bars 38 extend from the rocker arm ends 37 forwardly to rigidly mount the ground-penetrating members 20 at cross bar ends 40. Each bar 38 includes an integral upright bracket 41 that is affixed at an upper end to the adjacent eccentric pivot 30 and at a lower end to a socket 42. The sockets 42 releasably receive the ground-penetrating members 20 in substantial radial orientation to the eccentric axes.

The cross bars 38 are pivotably mounted at ends 39 to the rocker arms 35. They will pivot freely on the rocker arms about cross bar pivot axes in response to motion of the aerator means 27. The distances between the idler axes and the cross bar pivot axes are greater than the distance between the crank axes and the respective eccentric pivot axes. This assures that full rotation of the eccentric axes about the crank axis will result in rocking motion of the rocker arms about their idler axes, and that the cross bars 38 will therefore maintain the ground-penetration members 20 in a substantially upright orientation throughout their operational circuits.

The respective distances between the crank axis, eccentric pivot axis, idler axis, and cross bar pivot axis are unequal. They, together, form a trapazoidal configuration that imparts an elliptical motion to the ground-penetrating members 20 along vertical planes that are also parallel to the forward path of travel.

Figure 5:
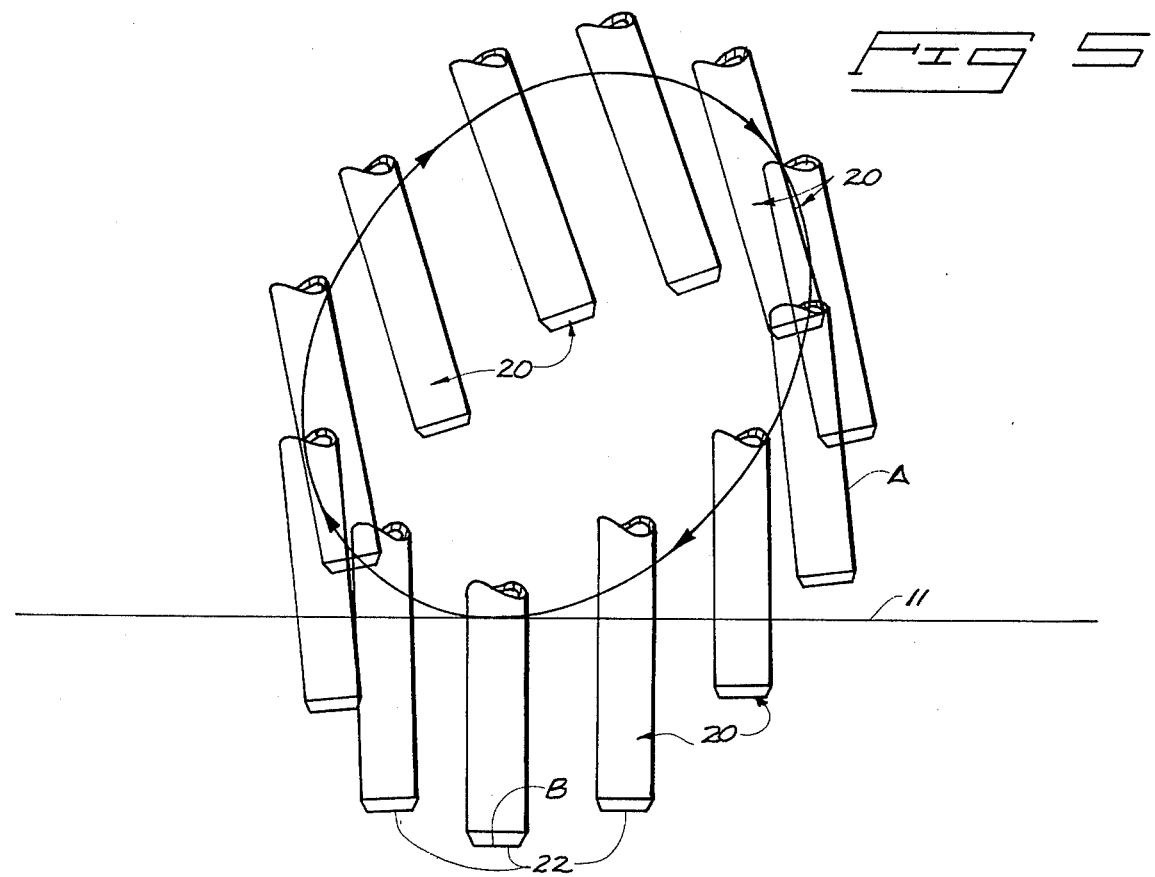
FIG. 5 is a schematic view illustrating different operational positions of a ground penetrating member throughout its operational circuit.

An operational circuit and various positions of one of the ground-penetrating members as it moves about the circuit are illustrated in FIG. 5. Rotation of the drive shaft and aeration means 27 produces the vertical motion components of the operational path while the rocker arm 35 and cross bar 38 simultaneously produce horizontal oscillational motion components. Together, the vertical and horizontal motion components define the inclined elliptical path as shown. Throughout this path, the ground-penetrating member 20 is held in a substantially upright orientation.

At a forward portion of the elliptical stroke, prior to engagement with the ground surface, the member 20 is slightly inclined rearwardly as shown at the position labeled A. This orientation approaches the vertical as the penetrating member continues along its elliptical path downwardly and rearwardly to quickly penetrate the ground and reach the lowest point B along the path at which deepest penetration with the ground surface is accomplished.

The entire aerator unit is pulled forwardly as the penetrating members successively engage the ground surface and move rearwardly on the frame 15. The geometry of the aerating means and linkage means is such that the penetrating members will be tipped rearwardly simultaneously as they are pulled upwardly out of the hole. As the frame continues to move forwardly, the upper end of the penetrating member (presently at the end of its stroke) is tipped rearwardly while being lifted upwardly from the formed hole. The rearward tipping motion corresponds with the forward motion so the member will leave a smooth, substantially circular hole, rather than tearing through the ground and leaving a slit rather than a circular hole.

One of the penetrating members will pull the frame forwardly and form a hole on one side of the frame. Meanwhile, the opposite penetrating member is being moved up and forwardly to initiate the next successive cycle in which the ground is again engaged and a hole is formed therein.

It is not always desirable to retain the ground penetrating members in the operative positions as shown by FIGS. 1 and 2. For example, the user may wish to start the engine on a hard surface such as a driveway or sidewalk prior to moving the aerator onto an adjacent ground area. For this reason, I have provided pivot joints 44 in the cross bars 38 that are connected to a lockout means including a control lever 45 to enable articulation of the cross bar to tip the penetrating members 20 upwardly (FIG. 4) changing the elliptical paths of the members 20 to elevations above the ground surface.

Figure 3:
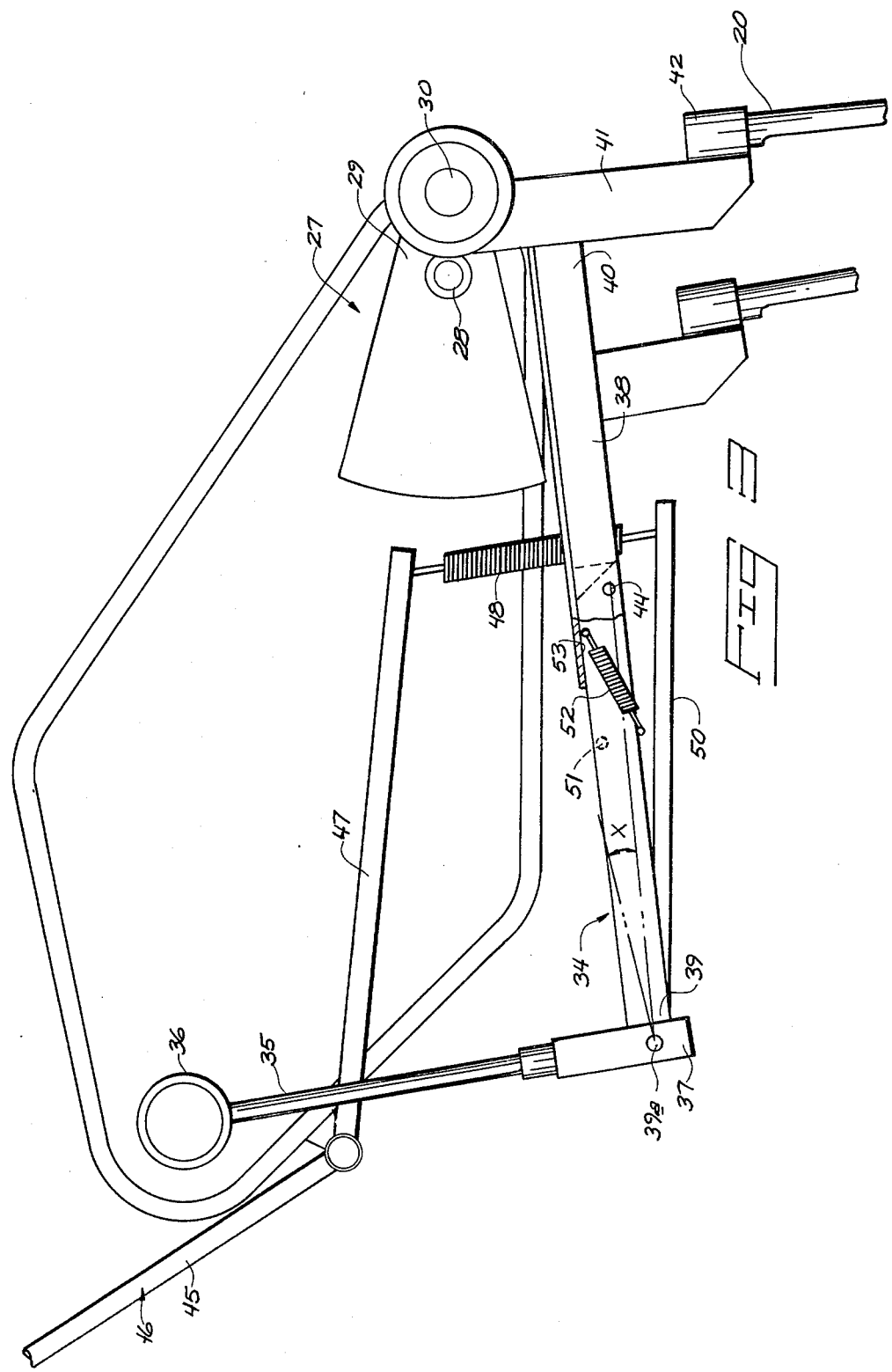
FIG. 3 is an enlarged detail view of a portion of the present aerator.
Figure 4:
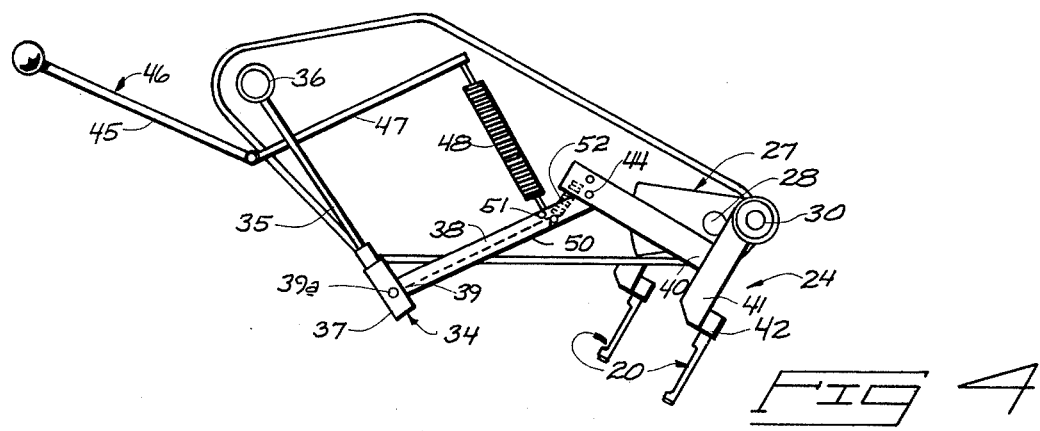
FIG. 4 is a reduced view similar to FIG. 3 only showing a different operational position of the elements therein.

The lockout means 46 operates to selectively articulate the cross bars at their pivot joints between straight, operative positions as shown in FIGS. 1 through 3 and angular inoperative positions as shown in FIG. 4. The ground penetrating members are correspondingly pivoted between operative and inoperative positions as shown relative to the ground surface.

The lockout means 46 includes actuator levers 47 that are pivotably connected to the control lever 45 at a pivot on the frame. The remote ends of the actuator levers 47 mount springs 48. The springs 48 extend from the actuator levers 47 to secondary actuator levers 50. The springs are connected to ends of levers 50 while the remaining lever ends are pivotably connected to the cross bars 38 and rocker arms 35 at the cross bar pivot axes.

A dog or abutment 51 extends into the pivotal path of each actuator lever 50. Upward movement of the associated actuator lever 47 brings the secondary actuator 50 into abutment with the dog 51 and causes articulation or pivotal movement of the opposed sections of the adjacent cross bar 38 in an upward direction. This correspondingly moves the respective ground-penetrating member to an inoperative position where its elliptical path is elevated above the ground surface. Appropriate detents (not shown) may be formed along the frame adjacent the control lever 45 that will facilitate locking of the control lever 45 in position to maintain the operative and inoperative positions of the cross bars and penetrating members 20.

The cross bars are normally urged toward the operative position by springs 52. Each spring 52 joins the pivoted sections of the cross bars 38 at their pivot joints and urges them to the normal straightened condition. Movement of the cross bars in a direction beyond the operative straightened condition is prevented by an abutment surface 53 on one of the cross bar sections.

The cross bars are prevented from buckling as the aerator means is rotated by a beyond dead-center relationship between the eccentric pivot axes and the cross bar pivot axes.

From the above description, operation of the present invention may now be understood.

Before initiating operation of the power means 18, the operator will preferably move the control lever 45 to lock the cross bars 38 and ground-penetrating members 20 in the inoperative FIG. 4 position. He is then free to start the engine with no fear of having the members 20 immediately engaging the ground below to initiate forward motion of the aerator.

Once the operator has positioned the aerator at a starting point along the ground surface, he may move the control lever 45 to bring the cross bar 38 and members 20 to their operative positions. The elliptical paths of the members 20 will then intersect the ground surface such that the members 20 will successively engage and move down and rearwardly with respect to the ground surface.

Vertical motion of the members 20 produces the successive holes along the ground surface while their horizontal motion produces forward motion of the aerator. This is accomplished continuously as the angularly opposed ground-penetrating members successively engage and disengage the ground surface. The member 20 on one side will be moved clear of the ground surface and will be moving forwardly in its next successive operational cycle while the opposite member 20 on the opposite side of the frame is engaged with the ground surface and is moving rearwardly to continue forward motion of the aerator.

The hole-forming members 20 are initially tipped rearwardly as they engage the ground surface. The linkage geometry then operates to tip the members 20 back forwardly to a substantially vertical orientation while they continue to penetrate the ground surface early on in the stroke. The angular movement of the members to the vertical orientation substantially corresponds with the forward movement of the frame. Thus the pointed ends of the tubular members will be moved nearly vertically downward to form upright holes while still at a forward end of the full stroke. Penetration occurs quickly and the members will remain fully engaged in the formed holes as the members move rearwardly to propel the aerator forwardly.

The members 20 are tipped slightly rearwardly as they are quickly withdrawn from the formed holes. The pointed ends 22 are withdrawn nearly vertically from the formed hole while the frame progresses forwardly. The holes resulting from operation of the present aerator are therefore typically uniform in shape, conforming to the outer cross sectional configuration of the ground-penetrating members 20.

The members 20 moved by the aerator means 27 cause forward movement of the frame. Since the elliptical movements of the members are 180° out of phase, the frame will be continuously "walked" along the ground by alternating ground engagement by the members 20. Movement of the aerator along the ground is therefore dependent only upon movement of the ground-penetrating members as they engage the ground and move rearwardly. There is no need to "time" movement of the members 20 in relation to movement of the frame. Also, the members are moved substantially vertically and quickly in relation to forward movement of the frame upon insertion and retraction from the ground. Clean, uniform holes are thereby formed while positive contact is maintained with the ground surface to avoid tearing by the members within the holes both as they are inserted and as they are withdrawn.

Of course, the present aerator 10 may be supplied with standard forms of clutch mechanisms, throttle controls, etc. that are not shown but are standard features on many other powered lawn and yard implements. Such modifications and others may be made within the scope of the present invention which is set forth in the following claims.

What I claim is:

1. A power aerator for forming a succession of holes along the ground surface while moving in a forward path, comprising:
    a wheel supported frame;
    power means mounted on the frame and including:
      (a) a drive shaft journalled on the frame for rotation about a crank axis perpendicular to the forward path;
      (b) an eccentric crank member mounted at one end of the drive shaft;
      (c) an eccentric pivot on the eccentric crank member defining an eccentric pivot axis spaced from and parallel to the crank axis;
    aerating means including a ground-penetrating member for displacing soil to form a hole in the ground surface, operatively connected to the power means for transmitting driving power to move the ground penetrating member vertically in relation to the ground surface to successively penetrate the ground surface;
    wherein the ground penetrating member is mounted to the eccentric crank member for free pivotal movement about the eccentric pivot axis;
    linkage means operatively connecting the ground-penetrating member and frame for imparting a horizontal oscillating motion to the ground penetrating member along an upright plane parallel to the forward path in response to operation of the power means including:
      (a) a rocker arm mounted to the frame for pivotal movement thereon about an idler axis; and
      (b) a cross bar rigidly connected to the ground penetrating member at one end and pivotably connected to the rocker arm at a remaining end for pivotal movement about a cross bar pivot axis spaced from the idler axis.

2. The aerator as defined by claim 1 further comprising:
    a second eccentric crank member mounted at a remaining end of the drive shaft;
    a second eccentric pivot on the second eccentric crank member defining a second eccentric pivot axis spaced equidistant with the eccentric pivot axis from the drive shaft axis and on an opposite side of the drive shaft axis therefrom; and
    a second eccentric crank member, ground penetrating member and linkage means operatively connected to the second eccentric crank member.

3. The aerator as defined by claim 2 wherein the second eccentric pivot axis is angularly spaced 180° about the crank axis from the eccentric pivot axis.

4. The aerator as defined by claim 1 wherein the ground penetrating member is comprised of a rigid hollow tubular member releasably mounted by a bracket to the cross bar and eccentric crank member.

5. The aerator as defined by claim 1 wherein the distance between the idler axis and the cross bar axis is greater than the distance between the crank axis and eccentric pivot axis.

6. The aerator as defined by claim 5 wherein the idler axis is located elevationally above the crank axis in relation to the ground surface.

7. The aerator as defined by claim 1 wherein the cross bar includes a pivot joint between its ends and further comprising lockout means for selectively articulating the cross bar at its pivot joint between a straight operative position and an angular inoperative position, with the ground penetrating member being correspondingly pivoted about the eccentric pivot axis between an operative position for engaging and successively penetrating the ground and an inoperative position clear of the ground.

8. A power aerator for forming a succession of holes along the ground surface while moving in a forward path comprising:
a wheel supported frame;
crank means rotatably mounted to the frame for rotation thereon about a crank axis;
power means on the frame for rotating the crank about the crank axis;
aerator means operably connected to the crank means about an eccentric axis spaced from the crank axis for movement as the crank is rotated about the crank axis and including a ground penetration member for displacing soil to form a hole in the ground surface in response to the reciprocating movement; and
linkage means pivotally connected to the frame for movement about an idler axis and attached to the aeration means for oscillating the penetration member about the eccentric axis in an upright plane parallel to the forward path, including:
(a) an elongated rocker arm freely pivotably mounted to the frame about the idler axis;
(b) a cross arm having one end mounted to a remote end of the rocker arm for pivotal movement thereon about a cross arm pivot axis that is spaced from the idler axis by a distance greater than the distance between the crank axis and eccentric axis, the cross arm also having a remaining end attached rigidly to the aeration means.

9. The aerator defined by claim 8 wherein the crank axis, eccentric axis, idler axis, and cross arm pivot axis are all parallel and horizontal on the frame.

10. The aerator as defined by claim 8 wherein the distances between all the named axes are unequal.

11. The aerator as defined by claim 8 wherein the cross bar includes a pivot joint between its ends and further comprising lockout means for selectively articulating the cross bar at the pivot joint between a straight operative position and an angular inoperative position wherein the ground penetrating member is correspondingly pivoted between an operative position for successively engaging and penetrating the ground and an inoperative position clear of the ground surface.

12. The aerator as defined by claim 11 wherein the pivot joint is located beyond a dead center relationship with the eccentric axis and cross arm pivot axis.

13. The aerator as defined by claim 8 wherein there are at least two aeration means operably connected to the crank means for vertical movement about two eccentric axes that are equidistant to the crank axis and angularly spaced from each other about the crank axis.

14. The aerator as defined by claim 13 wherein the angular distance about the crank axis between the eccentric axes is 180°.

* * * * *